United States Patent [19]
Hemmerle et al.

[11] Patent Number: 5,329,457
[45] Date of Patent: Jul. 12, 1994

[54] COMPREHENSIVE THREE-DIMENSIONAL ROTARY TOOL POINT COMPENSATION

[75] Inventors: R. David Hemmerle, Blue Ash, Ohio; James E. Randolph, Jr., Wilmington, N.C.

[73] Assignee: General Electric Company, Cincinnati, Ohio

[21] Appl. No.: 48,044

[22] Filed: Apr. 15, 1993

[51] Int. Cl.$^5$ .................. G06F 15/46; G05B 19/18
[52] U.S. Cl. .................. 364/474.35; 364/474.18; 318/572
[58] Field of Search .............. 364/474.17, 474.18, 364/474.34, 474.35, 474.37; 318/572; 408/147, 187; 483/30, 35

[56] References Cited

U.S. PATENT DOCUMENTS

| | | | |
|---|---|---|---|
| 3,492,467 | 1/1970 | Caban et al. | 364/474.34 |
| 3,555,254 | 1/1971 | Gerber | 364/474.34 |
| 3,684,874 | 8/1972 | Kelling | 364/474.34 |
| 3,953,918 | 5/1976 | Bone et al. | 483/41 |
| 3,963,364 | 6/1976 | Lemelson | 408/16 |
| 4,190,889 | 2/1980 | Etoh et al. | 364/474.34 |
| 4,281,385 | 7/1981 | Nakaso et al. | 364/474.34 |
| 4,334,178 | 6/1982 | Lipp | 318/572 |
| 4,382,215 | 5/1983 | Barlow et al. | 318/568 |
| 4,400,118 | 8/1983 | Yamakage et al. | 364/474.34 |
| 4,428,055 | 1/1984 | Kelley et al. | 318/572 |
| 4,499,546 | 2/1985 | Kuga et al. | 364/474.35 |
| 4,518,257 | 5/1985 | Donaldson | 356/375 |
| 4,533,286 | 8/1985 | Kishi et al. | 409/80 |
| 4,554,495 | 11/1985 | Davis | 318/572 |
| 4,572,998 | 2/1986 | Nozawa et al. | 318/572 |
| 4,583,159 | 4/1986 | Kanemoto et al. | 364/474.37 |
| 4,642,902 | 2/1987 | Niedermayr | 364/560 |
| 4,659,265 | 4/1987 | Kishi et al. | 409/84 |
| 4,893,971 | 1/1990 | Watanabe et al. | 364/474.3 |
| 4,899,094 | 2/1990 | Pilborough | 318/572 |
| 4,974,165 | 11/1990 | Locke et al. | 364/474.35 |
| 5,005,135 | 4/1991 | Morser et al. | 364/474.35 |
| 5,246,316 | 9/1993 | Smith | 364/474.34 |

Primary Examiner—Jerry Smith
Assistant Examiner—Paul Gordon
Attorney, Agent, or Firm—Charles L. Moore, Jr.; Jerome C. Squillaro

[57] ABSTRACT

The present invention provides a system and method to accurately provide three-dimensional rotary tool point compensation by evaluating a CNC machining center's geometric condition with respect to a trunnioned spindle mechanism of the machining center as it applies to the degrees of freedom of motion that affect the rotary tool point positioning of a cutting tool mounted in a tool holder of the spindle mechanism. The present invention evaluates the geometric condition of the trunnioned spindle mechanism by positioning the tool point in contact with a reference point or datum and recording a first coordinate position, then rotating the spindle mechanism 90° about a trunnion axis and positioning the tool point in contact with the same reference point a second time. A second coordinate location is recorded when the tool point contacts the reference point the second time. The rotary tool point offsets are then determined from the two recorded coordinate locations and the coordinates of the tool point may be appropriately automatically compensated for the offsets during a machining operation.

19 Claims, 6 Drawing Sheets

COMPREHENSIVE THREE-DIMENSIONAL ROTARY TOOL POINT COMPENSATION

RELATED PATENT APPLICATIONS

The present application is related to the following patent applications:

Co-pending Patent application Ser. No. 07/920,069, filed Jul. 27, 1992, which is still pending and a continuation-in-part of application No. 07/800,948, filed Dec. 2, 1991, entitled "AUTOMATED MAINTENANCE SYSTEM FOR COMPUTER NUMERICALLY CONTROLLED MACHINES", by R. David Hemmerle et al., now abandoned, on Jul. 27, 1992 which discloses and claims automatic techniques to evaluate a computer numerically controlled (CNC)machine s geometric conditions with respect to the various degrees of freedom of motion of the machine's movable components to determine whether alignment or machine restoration is required. This application is assigned to the same assignee as the present application and is incorporated herein in its entirety by reference.

Co-pending Patent application Ser. No. 07/801,355, filed Dec. 2, 1991, entitled "TOOL POINT COMPENSATION FOR HARDWARE DISPLACEMENT AND INCLINATION" by James E Randolph, Jr., et al., now abandoned on Mar. 29, 1993, which discloses and claims automatic techniques to accurately and repeatably evaluate the geometric condition of a workpiece mounted in a fixture on a pallet of a CNC machine with respect to the various degrees of freedom of motion of the workpiece fixtured on the pallet. This patent application is also assigned to the same assignee as the present application and is incorporated herein by reference in its entirety.

BACKGROUND OF THE INVENTION

The present invention relates to computer numerically controlled (CNC) machining centers and more particularly to evaluating and compensating for misalignments or error offsets associated with the multi-degrees of freedom of motion of a tool point of a rotary cutting tool mounted to a spindle mechanism which in turn is pivotably mounted to the machining center for rotation about a trunnion axis.

CNC machining centers are widely used in industry to manufacture components or parts from different types of materials. These machining centers typically have a rotary spindle mechanism with a tool holder at one end for holding a rotary cutting tool during a machining operation. The spindle mechanism is pivotably mounted to the machining center at an opposite end for rotation about a trunnion axis. These machining centers are set up to have an orthogonal X, Y, Z coordinate system and the computer controller monitors or keeps track of the coordinate location of the rotary tool point of the cutting tool during a machining operation or a machine alignment maintenance procedure.

Inaccuracies, misalignments or error offsets can cause the rotary tool point to actually be at one coordinate location while the computer controller has a different coordinate location stored in memory. These error offsets may be caused by wear of the machining center components, such as bearings, guide ways and the like, from extensive use of the machining center, wear of the cutting tool from use, differences between machines in multiple machine installations, misalignment of machine components during the original machine assembly, misalignment of machine components during a maintenance procedure or the machining center's geometric alignment is otherwise different from those geometric parameters which are planned and programmed into the controller.

These differences or error offsets can result in machining errors during manufacturing of a component. For very critical components which require very precise, accurate machining with small tolerances, such as those used in gas turbine engines for aircraft propulsion, these machining errors can be costly. These components are typically made from expensive superalloy type materials, and if a machining error is present, the component may have to be scrapped or reworked, if possible. If the component with a machining error is used in the final assembly of an engine, that component may have a significantly shorter useful life than expected.

It is accordingly a primary object of the present invention to provide a novel comprehensive three-dimensional rotary tool point compensation method and apparatus for minimizing or eliminating machining errors during a machining operation.

It is another object of the present invention to provide a comprehensive three-dimensional rotary tool point compensation method and apparatus which can be used by the computer numerical control of the machining center to adjust the tool point coordinate location during a machining operation for more accurate control of the machining operation.

These and other objects of the invention, together with the features and advantages thereof, will become apparent from the following detailed specification when read with the accompanying drawings in which like referenced numerals refer to like elements.

SUMMARY OF THE INVENTION

In accordance with the present invention, a method for compensating for tool point position offsets in a CNC machining center of the type having a rotary spindle with a tool holder at one end and at an opposite end is pivotably mounted to the machining center for rotation about a trunnion axis, includes the steps of: (a) mounting a cutting tool or a spindle alignment bar in the tool holder of the spindle; (b) positioning a tool point of the cutting tool or spindle alignment bar in contact with a reference point or datum; (c) storing a first coordinate location when the tool point is in contact with the reference point; (d) rotating the spindle and tool point 90° about the trunnion axis; (e) positioning the rotated tool point in contact with the same reference point or datum; (f) storing a second coordinate location when the rotated tool point is in contact with the reference point; and (g) determining at least one rotary tool point offset related to at least one degree of freedom of motion of the machining center from the first and second coordinate locations, if the stored locations are different. The rotary tool point error offset may be compensated by adjusting the coordinate locations of the tool point as the tool point is moved to different locations during a machining operation. The compensation is carried out in the software of the computer numerical control using simple trigonometric functions.

In accordance with the present invention, an apparatus for compensating for tool point error offsets includes a cutting tool or a spindle alignment bar which is mounted in the tool holder of the machining center spindle mechanism. Program means in the CNC positions the tool point of the cutting tool or spindle alignment bar in contact with a reference point or datum an initial or first time and a first coordinate location is stored by the CNC. The program means then causes the spindle and tool point to be rotated 90° about the trunnion axis and positions the rotated tool point in contact with the same reference point a second time. A second coordinate location is stored by the CNC. The program means then causes the CNC to determine at least one rotary tool point error offset related to the degrees of freedom of motion of the machining center from the two coordinate locations. The CNC is further programmed to compensate for the rotary tool point error offset by adjusting the coordinate locations of the tool point as the tool point moves to different locations during a machining operation.

DETAILED DESCRIPTION OF THE INVENTION

Figure 1:
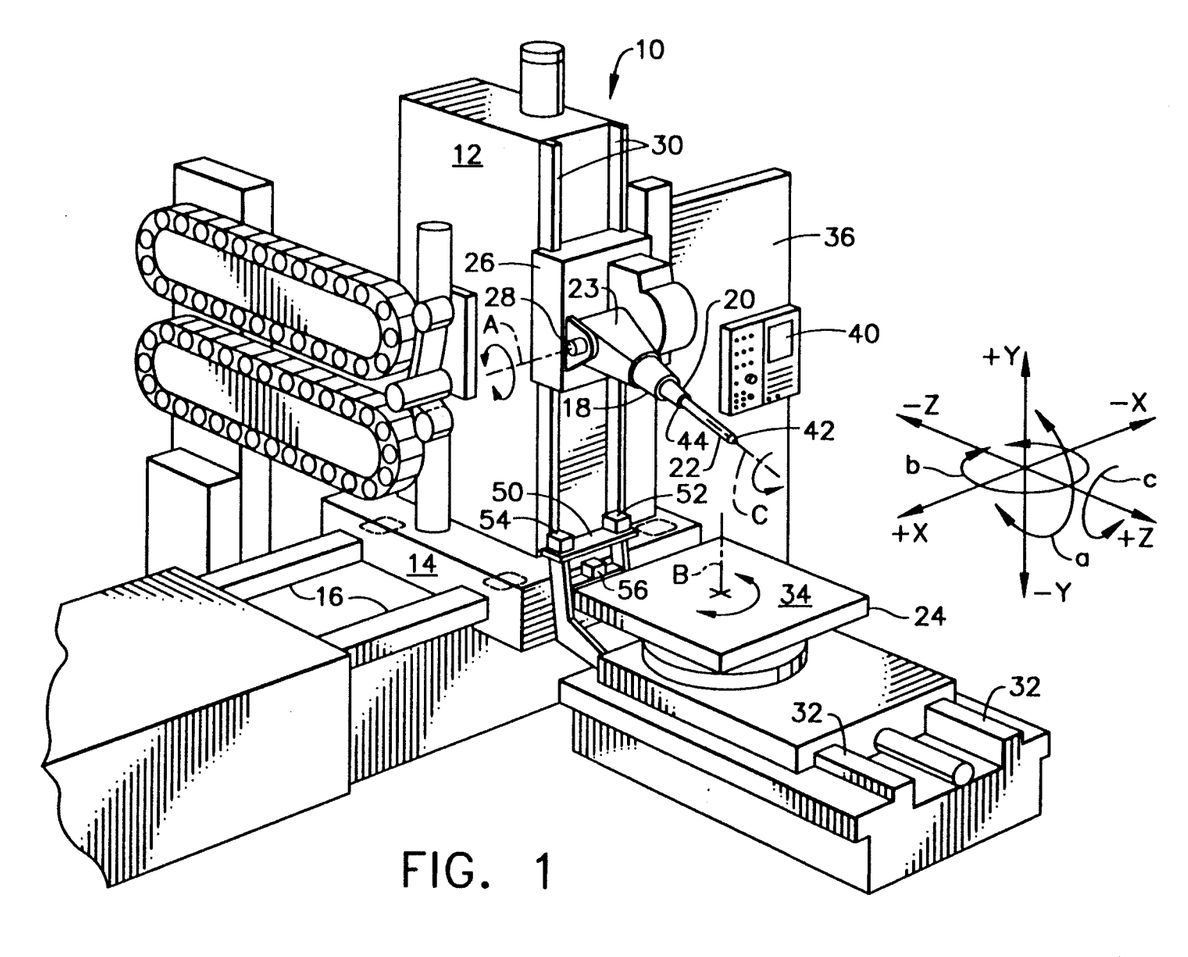
FIG. 1 is a perspective view of a CNC machining center including a reference coordinate system.

An example of a computer numerically controlled (CNC) machining center 10 to which the present invention may be applied is illustrated in FIG. 1. The Machining Center 10 is a 5-axis multi-purpose type machining center for milling, drilling, boring or the like, such as a T-30 five-axis machine as manufactured by Cincinnati Milacron, Cincinnati, Ohio. The CNC machining center 10 is constructed about a column 12 mounted on a linearly movable machine base 14 which is slidably resting on horizontal X direction guide ways 16 parallel to the X-axis of the machining center 10. Machining center 10 includes a spindle mechanism 18, and the center 10 functions to position, power and control the spindle mechanism 18 for rotation about an axis of rotation C. The spindle mechanism 18 includes a tool holder 20 for receiving and retaining various cutting tools 22, measuring devices or probes used in a machining process. The spindle mechanism 18, tool holder 20 and cutting tool 22 are rotated about axis C by a motor (not shown) disposed in a housing 23 of the spindle mechanism 18.

The CNC machining center 10 provides means for moving the cutting tool 22, being rotated by the spindle mechanism 18, relative to a workpiece (not shown), which is mounted at a particular position on a work table 24. Relative positioning between the workpiece and the cutting tool 22 is provided along three linear orthogonal axes of motion, X, Y and Z, and about two rotational axes of motion, trunnion axis A and table axis B as illustrated by the corresponding reference axes in FIG. 1.

CNC machining center 10 has a spindle carrier 26 to which spindle mechanism 18 is pivotably mounted by trunnions 28 which allow spindle mechanism 18 to be pivoted about trunnion axis A which should be substantially parallel to the X axis of the machine 10. With respect to the X, Y and Z linear machine axes illustrated in FIG. 1, spindle mechanism 18 will be parallel to the Z axis at a trunnion angle of $\theta = 0°$. Spindle carrier 26 is slidably mounted to vertical guide ways 30 which are parallel to the Y-axis of machining center 10 and are mounted to column 12 to provide motion of spindle mechanism 18 along the Y-axis.

Horizontal guide ways 32 which are oriented parallel to the Z-axis are provided to slidably support work table 24. Work table 24 includes a table top 34 which is rotatable about a vertical table axis B which, when properly vertically aligned, is parallel to the Y-axis of the machine.

Control of the CNC machining center 10 is provided by a computerized controller 36 including a display 40. The controller 36 is generally mounted near or in the vicinity of the column 12 and the work table 24. Computerized controller 36 is programmable by a numerical control (NC) tape. The NC tape is a programmable machine readable media widely used in machining.

In accordance with the present invention, the controller 36 may be programmed by an NC tape to perform the three-dimensional rotary tool point evaluation of the machining center 10 and to produce compensating offsets to be used by the machining center 10 during a machining process.

It should be noted that the machining center 10 shown in FIG. 1 is merely for purposes of explaining the present invention and those skilled in the art will recognize that the present invention is applicable to any CNC machine with similar machining components and degrees of freedom of motion.

Misalignments or offsets may be present between geometric parameters of the machining center 10 which are planned or preprogrammed into the computerized machine controller 36 and the actual geometric parameters. These offsets may be caused by wear of internal machining center components, wear of the cutting tool 22, differences between machines in multiple machine installations, misalignment during the original machine assembly, misalignment during maintenance procedures or the machining center's geometric alignment is otherwise different from those geometric parameters which are preprogrammed into the controller 36.

As described in more detail herein below, the present invention determines a set of error offsets related to the degrees of freedom of the machining center 10. The error offsets determined by the present invention are defined as a Tool Length Offset (TLOE), a Trunnion Distance Offset Error (TDOE), a Crossover Offset Error (COE) between the trunnion axis A and spindle axis C and a Slice Error (SE) or shift of a tool point 42 of the cutting tool 22 along the X-axis as the spindle mechanism 18 is rotated about trunnion axis A. In accordance with the present invention, the planned or programmed geometric parameters are then automatically adjusted or reset in the controller 36 in accordance with the determined error offsets to more accurately machine a workpiece.

Figure 2A:
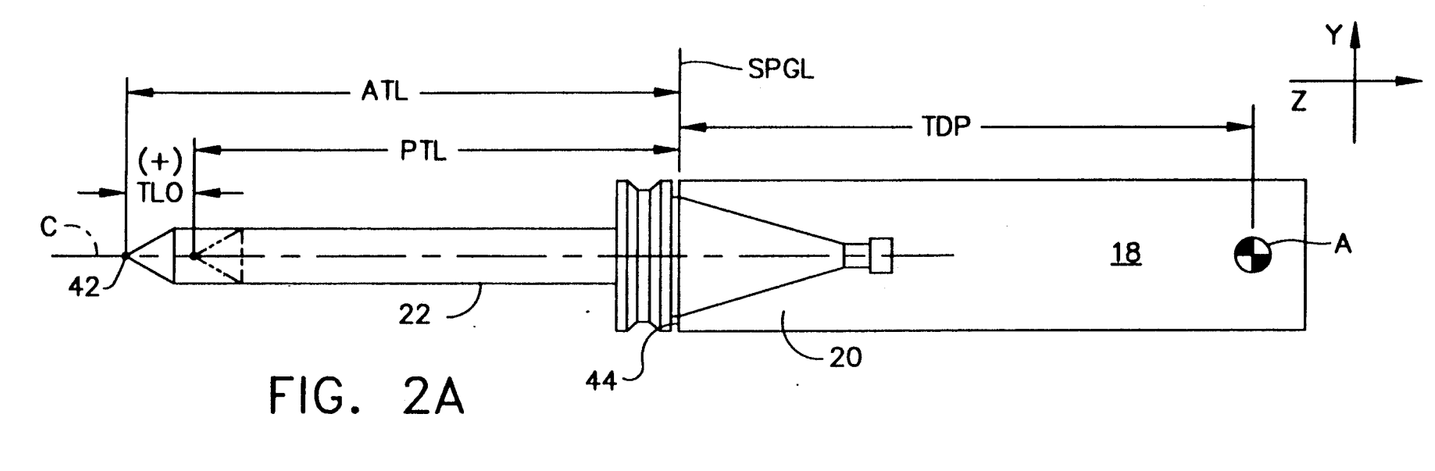
FIGS. 2A and 2B are each diagrammatic illustrations of a cutting tool mounted in a spindle mechanism of a CNC machine for determination of a Tool Length Offset (TLO) in accordance with the present invention.
Figure 2B:
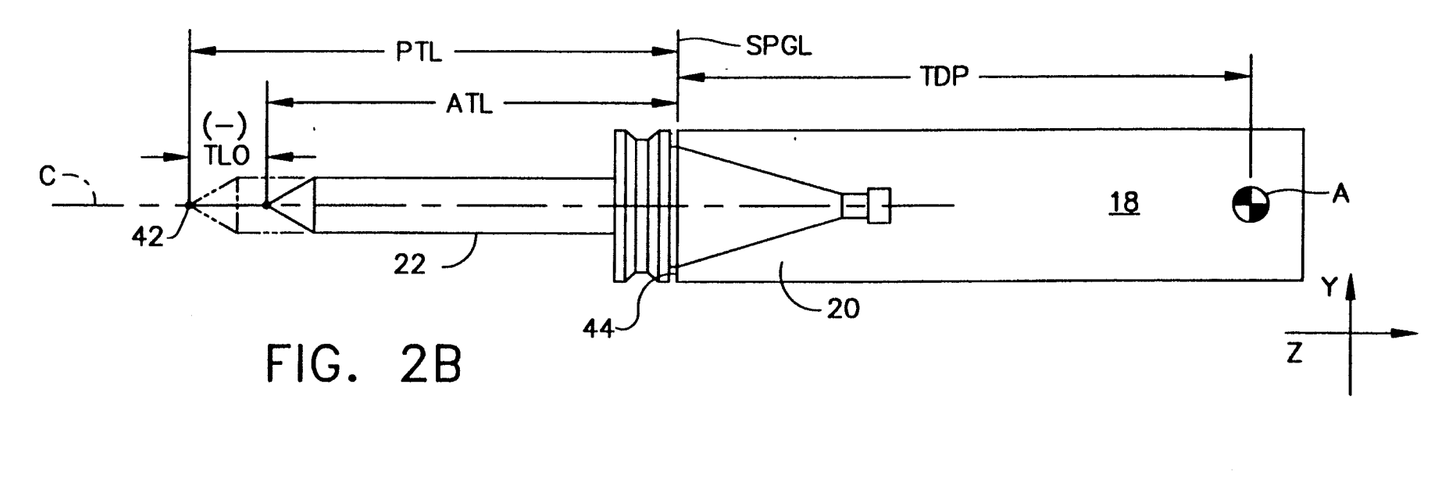
Figure 3:
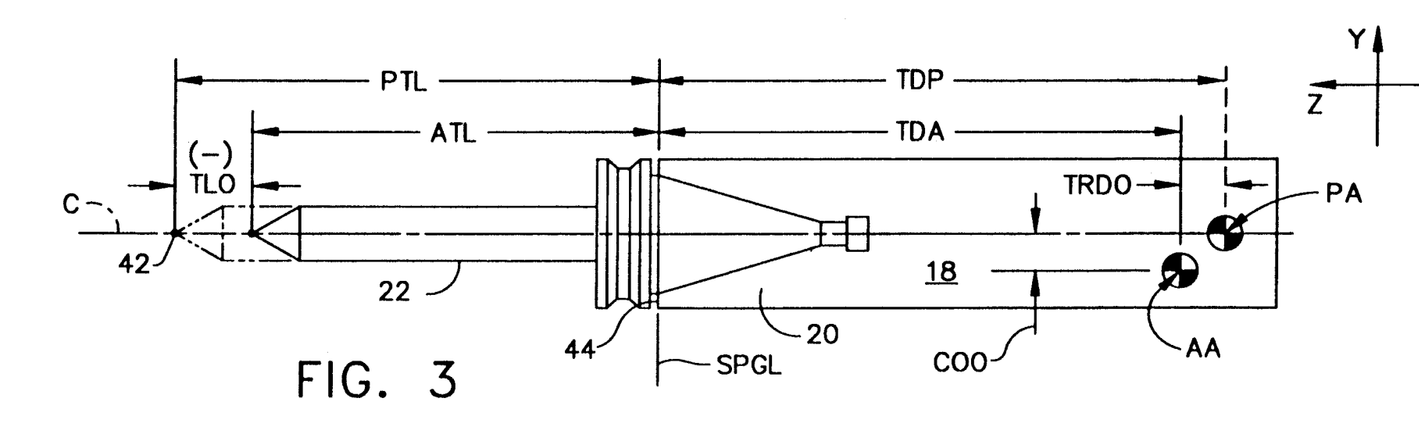
FIG. 3 is a diagrammatic illustration of a cutting tool mounted in a spindle mechanism of a CNC machining center for determination of a Trunnion Distance Offset (TRDO) and a Crossover Offset (COO) in accordance with the present invention.

In accordance with the present invention, the cutting tool 22 or a spindle alignment bar is inserted into and received by the tool holder 20 of spindle mechanism 18. For purposes of explanation, the tool 22, spindle mechanism 18 and trunnion axis A are shown diagramatically in FIGS. 2A, 2B and 3. FIGS. 2A, 2B and 3 are views looking parallel to the X-axis of the machining center 10 and parallel to the trunnion axis of rotation A, or in other words, the figures are views looking perpendicular to the YZ plane of the machine coordinate axes. Tool 22 has a Planned Tool Length (PTL) which is the standard tool length preprogrammed into the machine controller 36 for tools of this type or for the spindle alignment bar, if such a bar is being used. The PTL is the distance between the tool point 42 and a Spindle Gage Line (SPGL). The SPGL is a reference point on the tool 22 or spindle alignment bar which corresponds to an expected location of a tool receiving end 44 of spindle mechanism 18 when the tool 22 or spindle alignment bar is inserted into and received by the tool holder 20 of the spindle mechanism 18. Because of the wear or misalignment factors previously described, the Actual Tool Length (ATL), when the tool 22 or alignment bar is inserted into spindle mechanism 18, may be longer than the PTL, a Positive Tool Length Offset (+TLO), as illustrated in FIG. 2A, or shorter than the PTL, a Negative Tool Length Offset (−TLO), as illustrated in FIG. 2B.

Referring to FIG. 3, the spindle mechanism 18 will have a planned or computer stored length between the SPGL and the planned or computer stored trunnion axis A (PA), which is referred to herein as the Planned Trunnion Distance (TDP); however, because of machine misalignment or inaccuracies caused by the factors previously described, the actual length between the SPGL and the actual trunnion axis (AA), referred to herein as Actual Trunnion Distance (TDA), may be longer or shorter as illustrated in FIG. 3, the difference between TDP and TDA being the Trunnion Distance Offset Error (TDOE). The TLO and TDOE are combined algebraically as described herein below to provide a Normal Direction Length Offset (NDLO).

Also shown in FIG. 3 is a Crossover Offset Error (COE) which occurs when the actual trunnion axis location (AA) is offset in the Y direction from a programmed or planned trunnion axis (PA) location.

Figure 4:
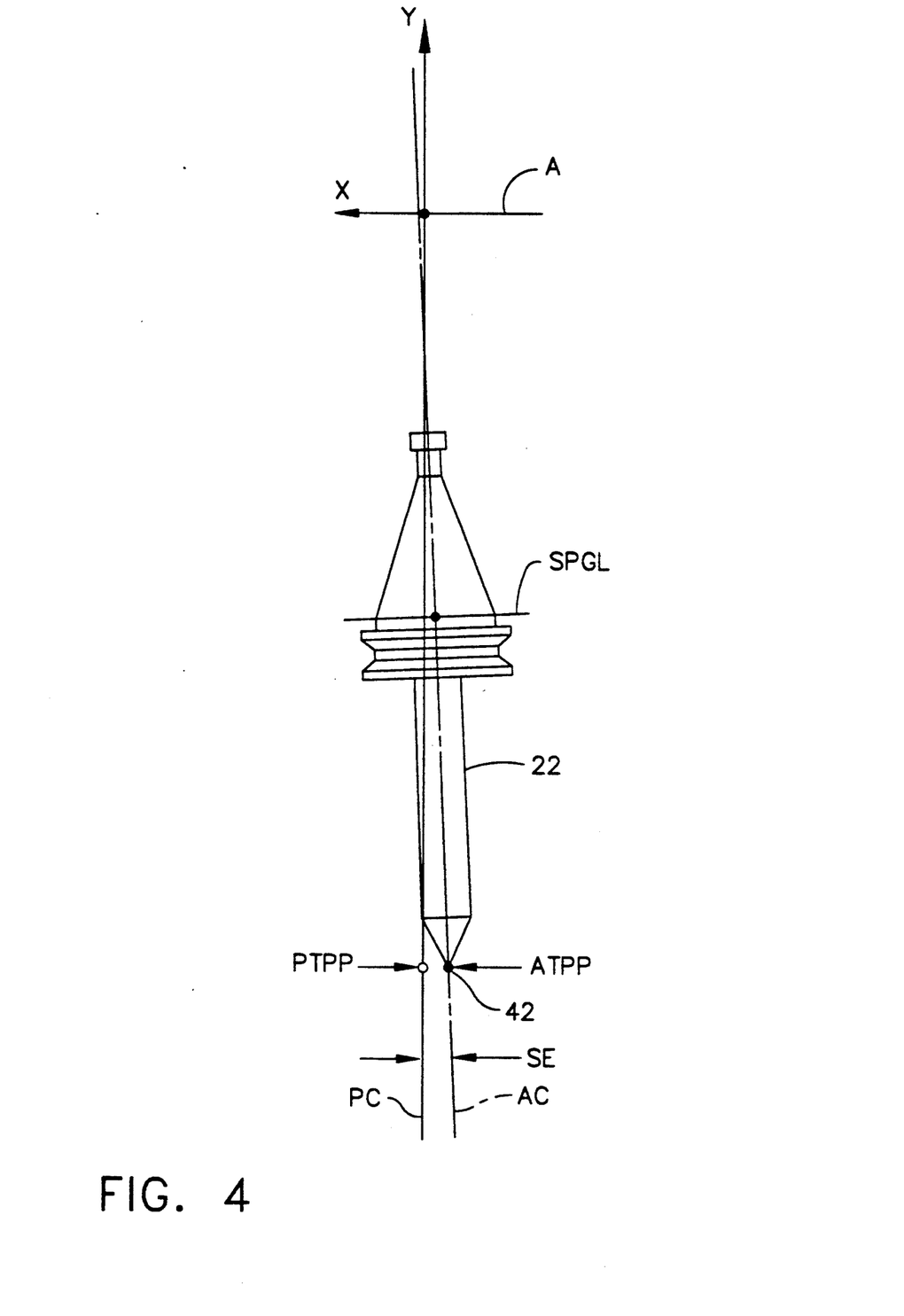
FIG. 4 is a diagrammatic illustration of a cutting tool mounted in a spindle mechanism of a CNC machining center for determining a Slice Error Offset (SEO) in accordance with the present invention.

Referring to FIG. 4, which illustrates diagramatically the relationship between tool 22 and trunnion axis A looking parallel to the Z-axis or perpendicular to the XY plane, a Slice Error (SE) occurs when the actual spindle axis of rotation (AC) becomes skewed or offset with respect to a programmed or planned spindle axis of rotation (PC) as the spindle mechanism 18 and tool 22 rotate about trunnion axis A. The amount of SE may vary as spindle mechanism 18 rotates about trunnion axis A. To explain more fully, assume that when the spindle mechanism 18 and tool 22 are in a horizontal position, parallel to the Z-axis with the trunnion angle of the spindle mechanism at $\theta=0°$ (tool 22 is pointing out of the page), the spindle axis of rotation C (also coming out of the page) will be perpendicular to the trunnion axis of rotation A. As the spindle mechanism 18 and tool 22 are rotated to a vertical position ($\theta=-90°$) the spindle axis of rotation C may intersect the trunnion axis A at some angle other than exactly perpendicular because of the misalignments or machine wear which can occur as previously described. Thus, the controller 36 believes that tool point 42 is in a planned or programmed position (PTPP—Programmed Tool Point Position) while the tool point 42 is actually at a different position, ATPP—Actual Tool Point Position. The difference between the PTPP and ATPP is the Slice Error (SE) and the Slice Error Offset (SEO) will be the difference in the X-axis direction between the PTPP and the ATPP.

In accordance with the present invention, the offsets just described are calculated and the coordinate locations of the tool point 42 are compensated by moving the spindle mechanism 18 with the tool 22, such as a spindle alignment bar 44 (FIG. 5) of known tool length and diameter, mounted in the tool holder 20 to a first position, preferably at a trunnion angle of $\theta=0°$, where the alignment bar 44 is brought into contact with a fixed reference point or datum.

Figure 5:
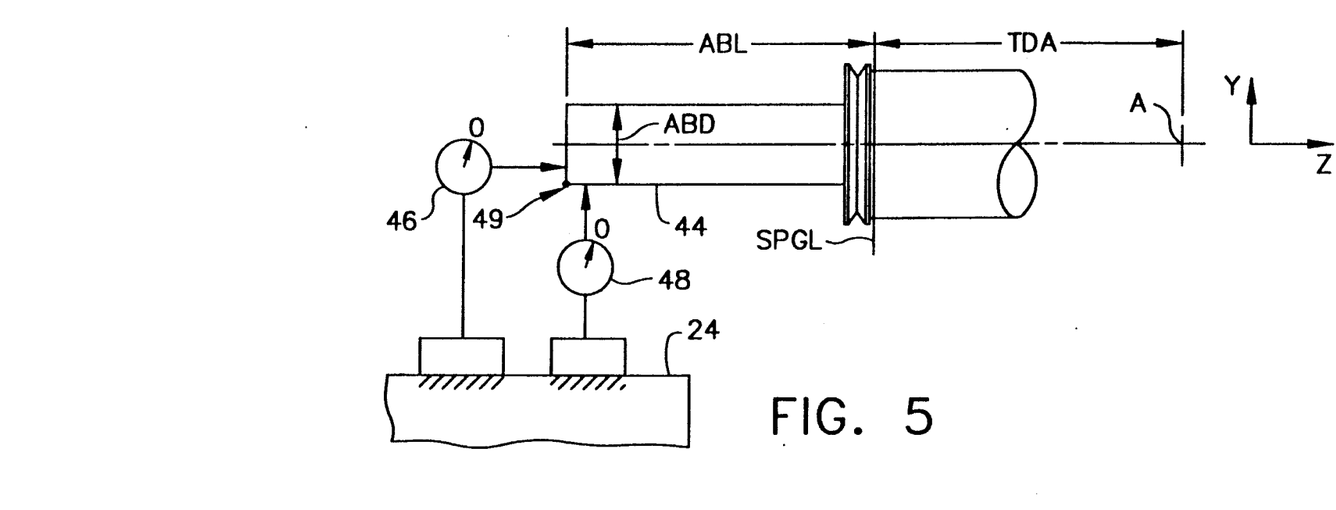
FIG. 5 is a diagrammatic illustration representing a spindle alignment bar being horizontally presented to a pair indicators measuring respectively in the Y and Z axis directions in accordance with the present invention.
Figures 6, 7:
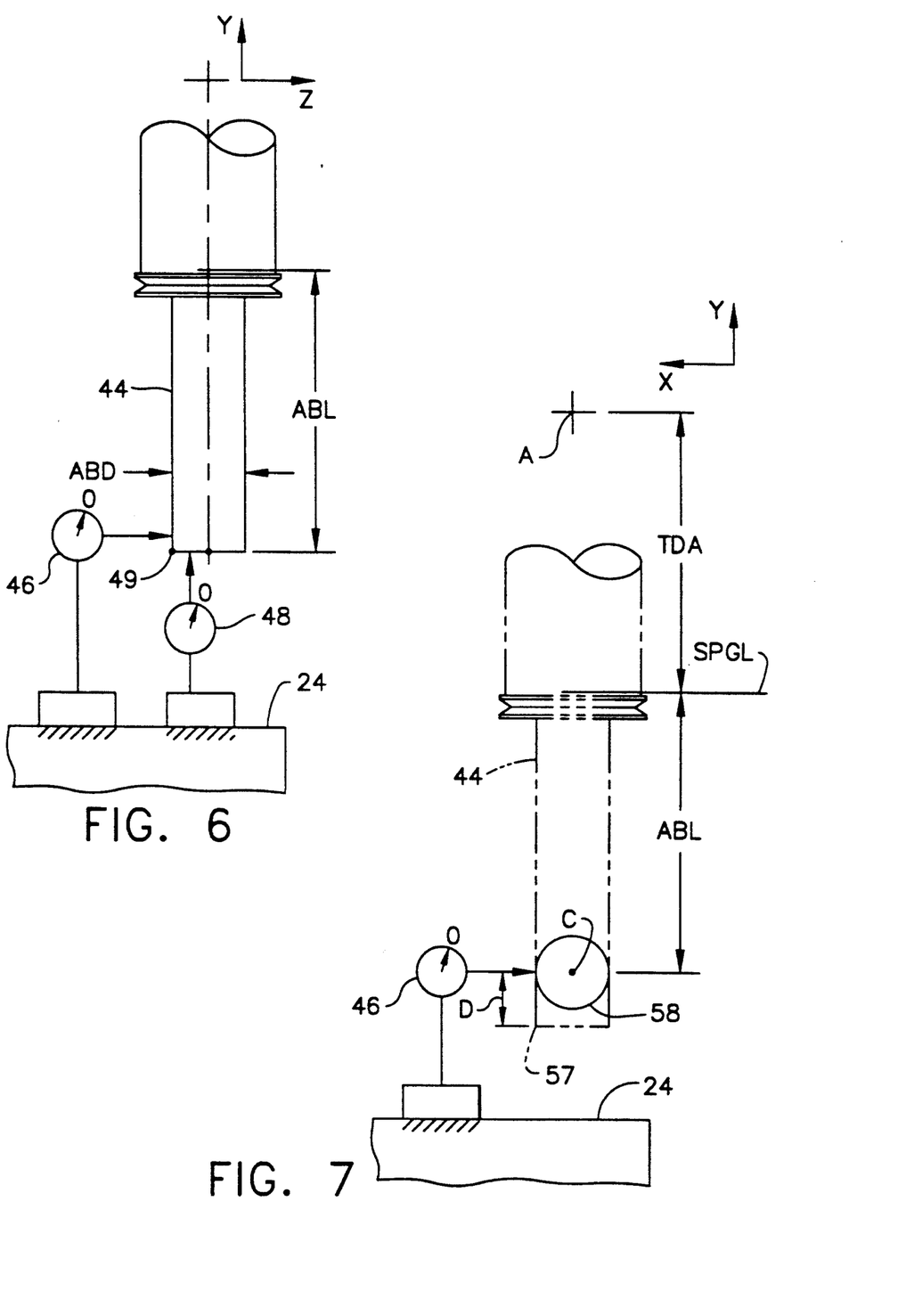
FIG. 6 is a diagrammatic illustration representing the spindle alignment bar being vertically presented to the pair of indicators in accordance with the present inaction.
FIG. 7 is a diagrammatic illustration representing the spindle alignment bar being presented alternately horizontally and vertically to an indicator measuring in the X axis direction in accordance with the present invention.

Referring to FIG. 5, the fixed reference point or datum is determined using a pair of dial indicators 46 and 48 which are mounted on the work table 24. The indicator 46 is positioned to measure displacement in the Z direction and the indicator 48 is positioned to measure displacement in the Y direction. The alignment bar 44 is positioned by rotating the spindle mechanism 18 to a trunnion or A axis angle of $\theta=0°$ and by feeding the alignment bar 44 into the indicators 46 and 48. A datum point 49 on the spindle alignment bar 44 is brought into contact with the indicators 46 and 48. The indicators 46 and 48 are then set to read zero. The machine's coordinate axis position is recorded as $Y_1$ and $Z_1$ by the controller 36. The alignment bar 44 is then fed off the indicators 46 and 48, and the spindle carrier 26 is fed upwardly in the Y direction so that the spindle mechanism 18 can be rotated about the A axis to an angle $\theta=-90°$. The spindle mechanism 18 is now in the vertical position and the alignment test bar 44 is fed into the two indicators 46 and 48 until the datum point 49 contacts the indicators and the indicators again read zero as shown in FIG. 6. The machine's coordinate position is recorded as $Y_2$ and $Z_2$.

If the machine 10 has no trunnion distance error or crossover error, the change in the two measured coordinate positions should be as follows:

(1) The change in Z axis position = the trunnion distance + the known length of the alignment bar − one half of the alignment bar's diameter.

(2) The change in the Y axis position = the trunnion distance + the known length of the alignment bar − one-half of the alignment bar's diameter.

Therefore, from the two recorded machine positions, and the known length and diameter of the spindle alignment bar 44, the actual Trunnion Distance Offset Error (TDOE) and Crossover Error (COE) can be calculated. However, different values may exist between the Z and Y axis position calculations. The difference in these values enables the trunnion distance and crossover error to be established according to the following equations:

$$Z_2 - Z_1 = TDP + ABL - \frac{ABD}{2} + TDOE_1$$

$$Y_2 - Y_1 = TDP + ABL - \frac{ABD}{2} + TDOE_2,$$

where ABL is the alignment bar length, ABD is the alignment bar diameter and TDP is the planned trunnion distance. Solving these equations for $TDOE_1$ and $TDOE_2$ provides the following equations:

$$TDOE_1 = Z_2 - Z_1 - TDP - ABL + \frac{ABD}{2}$$

$$TDOE_2 = Y_2 - Y_1 - TDP - ABL + \frac{ABD}{2}.$$

In the above two calculations, there can exist different trunnion distance errors. The reasons for this is the crossover error or the fact that the spindle centerline of rotation C does not intersect the trunnion axis of rotation A. This results in different observed trunnion distances between the horizontal and vertical spindle positions.

The true or average Trunnion Distance Offset Error (TDOE) will be the average of $TDOE_1$ and $TDOE_2$ as follows:

$$TDOE = \frac{TDOE_1 + TDOE_2}{2}.$$

The true or average trunnion distance offset error may also be referred to as the Trunnion Distance Length Error (TDLE).

One-half of the spread of the two observed trunnion distance offset errors equals the Crossover Error (COE) between the spindle centerline of rotation C and the trunnion axis of rotation A as follows:

$$COE = \frac{TDOE_1 - TDOE_2}{2}.$$

The trunnion distance offset error and the crossover error evaluations may also be accomplished by using an infrared light beam 50, projected between a source 52 and a detector 54 and the spindle alignment bar 44 to capture the two machine positions (FIG. 1) or a datuming cube 56 may be used with a spindle mounted probe. If this latter probing method is employed, the probe's effective length and effective tip size must be known.

Turning now to the Slice Error (SE) evaluation, the setup for this evaluation is illustrated in FIG. 7. The Slice Error is an angular error that results in an X direction shift of the tool point 42 along the X axis as the spindle 18 moves from a horizontal to a vertical position.

One of the dial indicators 46 is positioned to measure in the X direction and is mounted on the work table 24. The test bar 44 is positioned by the machining center 10 so that the test bar 44 is horizontally presented to the dial indicator 46 with the trunnion or A axis at an angle of a $\theta = 0°$ and so that the center of the test bar's diameter contacts the dial indicator 46 at a selected distance D from the end 57 of the test bar. For purposes of explanation, the selected distance D is assumed to be $\frac{1}{2}"$. In this horizontal position, the alignment test bar 44 is pointing out of the page in a first position 58 as shown in FIG. 7. With the test bar 44 in contact with the dial indicator 46 at the selected point, the indicator is set to zero and the X axis position of the machine 10 is recorded as $X_1$ by the controller 36.

The alignment test bar 44 is then fed by the machine 10 off the indicator 46 in the Y+ direction and is fed to a position to enable the spindle mechanism 18 to be rotated about the A axis to an angle $\theta = -90°$ corresponding to a vertical position. The alignment test bar 44 is then fed in the Z and Y directions into the indicator 46 so that the indicator 46 contacts the center of the test bar's diameter at the selected distance D from the end 57 of the test bar 44. This is the same point on the test bar 44 as used in the horizontal position 58. The test bar 44 in this second vertical position is shown in phantom in FIG. 8. The test bar 44 is fed into the indicator 46 until the indicator reads zero. The X axis position or coordinate location of the machine 10 is then recorded as $X_2$ by the controller 36.

$X_2$ minus $X_1$ equals the X axis direction shift for an arm distance equal to the actual trunnion distance plus the alignment bar length minus the selected distance D.

The amount of the Slice Error will be dependent upon the actual tool length being rotated and will be determined as a sine function as the spindle rotates from a horizontal position to a vertical position.

The Slice Error (SE) for a specific tool length may be determined according to the following equation:

$$SE = \frac{TD + TL}{TD + ABL - D} (\Delta X)(\sin\theta),$$

where TD is the actual trunnion distance, TL is the actual tool length for the specific tool being used, ABL is the alignment bar length, D is the selected distance from the end of the test bar 44 of the point where the dial indicator contacts the test bar 44, $\Delta X$ is the shift in the observed X direction and $\theta$ is the angle of the spindle mechanism 18 relative to the Z axis or the angular position of the spindle mechanism 18 about the trunnion axis A.

The Slice Error evaluation can also be established using the probe and datum cube, however, the evaluation cannot be established from the horizontal infrared beam 50 because the X direction beam does not indicate X direction shifts.

If the machining center 10 is properly aligned, there will be no offsets encountered. However, if offsets are encountered from the above evaluations, they can be corrected by the CNC controller 36 as follows.

Figure 8A:
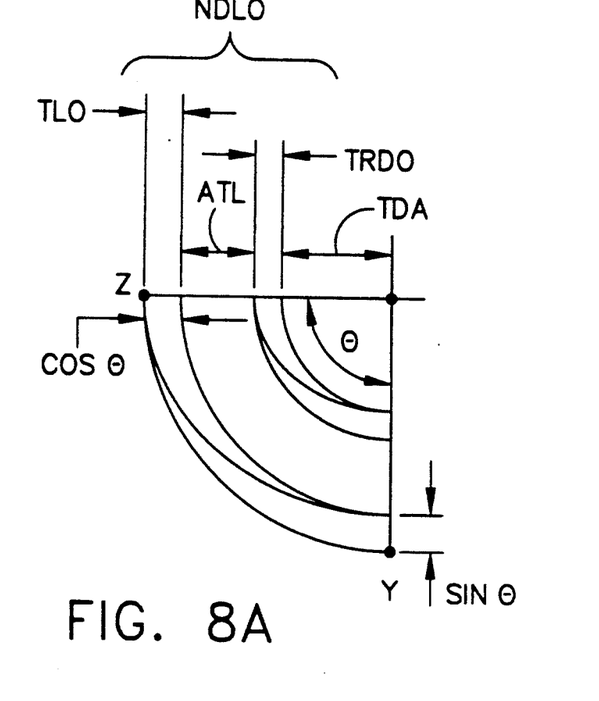
FIGS. 8A-8B are two-dimensional diagrammatic illustrations representing the method for compensating for the tool point error offsets illustrated in FIGS. 2-4 in accordance with the present invention.

Referring to FIG. 8A, the Trunnion Distance Offset (TDOE) is algebraically combined with the Tool Length Offset (TLO) to form a Normal Direction Length Offset (NDLO). The NDLO is then removed from the Z axis direction as a function of the cosine of the rotary axis or trunnion axis A angular position and is added into the Y axis direction as a function of the sine of the trunnion axis A angular position. The NDLO is a function of both the Y axis and the Z axis because the error will show up in both of these two directions as the spindle 18 rotates about the trunnion axis A to an angular position other than a trunnion axis angle of $\theta = 0°$.

As previously discussed, the NDLO is the algebraic sum of the Tool Length Offset (TLO) and the Trunnion Distance Offset (TDOE). The Y axis and Z axis coordinate positions of the tool point 42 may then be adjusted in the controller 36 to compensate for the NDLO during a machining operation according to the following equations:

Z axis compensation for $NDLO = NDLO \cos \theta$

Y axis compensation for $NDLO = NDLO \sin \theta$, where $\theta$ is the angular position of the tool point 42 about the trunnion axis A.

To explain the NDLO compensation process more fully, as an example, assume that the tool length offset combined with the trunnion distance offset equals 0.0024". When the trunnion axis A is $\theta = 30°$, the Z axis coordinate compensation will be 0.0024 cos 30° or 0.002079", and the Y axis coordinate compensation will be 0.0024 sin 30° or 0.001200".

Figure 8B:
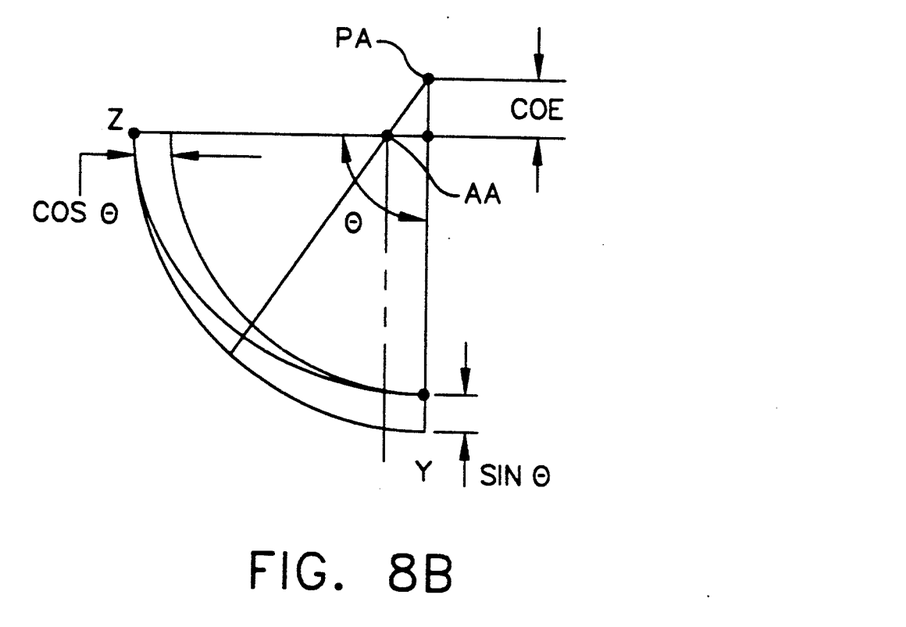

Referring to FIG. 8B and continuing this example, if the Crossover Offset Error (COE) calculation has the trunnion axis A positioned at 0.0032" above the horizontal spindle axis of rotation C as the spindle mechanism 18 is rotated to an angle of $\theta = 30°$, additional compensation for the crossover error needs to be algebraically combined to the NDLO Y and Z axis compensations to have the tool point 42 in its proper position during a machining operation.

In this case, the tool point 42 is correct at the horizontal spindle position, $\theta = 0°$, but as the spindle rotates about the trunnion axis to an angular position of $\theta = 30°$, the machine's coordinate system needs to move the Z axis in a minus direction at the same time it moves the Y axis in the minus direction to maintain the proper tool point position.

The Y axis and the Z axis coordinate positions of the tool point 42 may then be adjusted in the controller 36 to compensate for the COE during a machining operation according to the following equations:

Z axis compensation for $COE = COE \cos \theta$

Y axis compensation for $COE = COE \sin \theta$ or COE sin $\theta$ is subtracted from both machine coordinate positions to maintain the proper tool point position. In the present example, 0.0032 sin 30° equals 0.0016. Combining the NDLO and the COE compensation:

NDLO  $Y = 0.001200, Z = 0.002079$
$-$COE  $Y = 0.001600, Z = 0.001600$ the resulting combined compensation for the Y axis and Z axis is:

Y axis compensation $= (0.001200$
$-0.001600) = (-)0.0004$

Y axis compensation $= (0.002079$
$-0.001600) = (+)0.00479$.

However, there is also the slice error (SE) in the X direction that also may need to be compensated.

Referring back to FIG. 7 and, as an example, the indicator 46 was set to zero when the test bar 44 was horizontal or A axis $= 0°$; however, assume that it advanced 0.005" when the test bar 44 was moved to the vertical position A axis $= -90°$. Also assume the trunnion distance (TD) is 12.500" and the test bar (TL) is 10.5000". Additionally, the indicator contacted the test bar 44 0.500" from the end; therefore, the resulting observed arm was $(12.500 + 10.500 - 0.500)$ or 22.500". The slice error has an X axis direction error of 0.005" with an arm of 22.500" in a 90° observation.

This slice error in the X axis direction is seen as a sine function of the trunnion axis of rotation A. For the test bar example with a 22.500" arm the tool point would be off 0.005 sin 30° or 0.0025" in the (+) direction, or a slice error compensation of $-0.0025$" in the X axis needs to be applied. The actual slice error compensation is a function of the tool length in the following relationship:

SE compensation $= ((TD + TL) $ slice ratio$) \sin \theta$.

The slice error ratio is the actual arm divided by the observed arm, and this quantity is multiplied by the observed displacement $\Delta X$ and the sine of the angular position of the spindle mechanism 18 about the trunnion axis A.

The X axis slice error compensation in the assumed example for an 8.000" tool would be $$SE \text{ compensation} = \frac{(12.5 + 8.0)}{(12.5 + 10.0)} (0.005) \sin 30°$$
$$= 0.002278"$$

Those skilled in the art will recognize that the mathematics may be accomplished in several methods, and the mathematics format may differ at the machine control. However, the descriptions, sketches and example enables those skilled in machine tool geometry to fully understand how the errors are evaluated and how the compensations are calculated.

Those skilled in the art of on machine probing will recognize that the trunnion distance, crossover error and slice error can be established automatically on machines with the proper probing sensors.

It will be readily understood by those skilled in the art that the present invention is not limited to the specific embodiments described and illustrated herein. Different embodiments and adaptations besides those shown herein and described, as well as many variations, modifications and equivalent arrangements will now be apparent or will be reasonably suggested by the foregoing specification and drawings, without departing from the substance or scope of the invention. While the present invention has been described herein in detail in relation to its preferred embodiments, it is to be understood that this disclosure is only illustrative and exemplary of the present invention and is made merely for purposes of providing a full and enabling disclosure of the invention. Accordingly, it is intended that the invention be limited only by the spirit and scope of the claims appended hereto.

What is claimed is:

1. A method for compensating for tool point position offsets of a computer numerical controlled (CNC) machining center of the type having a rotary spindle, wherein the spindle includes a tool holder at one end and is pivotably mounted for rotation about a spindle trunnion axis at an opposite end, the method comprising the steps of:

(a) mounting a spindle alignment bar in the tool holder of the spindle;

(b) positioning the spindle alignment bar in contact with a reference point;

(c) storing or recording a first coordinate location when the spindle alignment bar is in contact with the reference point;

(d) rotating the spindle alignment bar 90° about the trunnion axis;

(e) positioning the spindle alignment bar in contact with the same reference point;

(f) storing or recording a second coordinate location when the rotated alignment bar is in contact with the reference point; and (g) determining at least one rotary tool point offset related to at least one degree of freedom of motion of the machining center from the first and second coordinate locations if the stored or recorded locations are different.

2. The method of claim 1, further comprising the step of compensating for the at least one rotary tool point offset by adjusting each coordinate location of a tool point in the computer numerical control of the machining center as the tool point moves to different locations during a machining operation.

3. The method of claim 1, wherein step (g) comprises the step of calculating a three dimensional rotary tool point offset from the first and second coordinate locations, the first and second coordinate locations being related to a degree of freedom of motion of the spindle, the degree of freedom of motion being measurable by the machining center from a pair of dial indicators when contacted by the spindle alignment bar.

4. The method of claim 1, wherein the machining center has an orthogonal X, Y, Z coordinate system with the spindle trunnion axis being defined as parallel to the X axis, and wherein the machining center has a planned trunnion distance (TDP) and the spindle alignment bar has a predetermined length (ABL) and a predetermined diameter (ABD);

the steps (b) and (c) further comprising the steps of:

horizontally presenting the spindle alignment bar to a pair of dial indicators, one observing in a Y axis direction and the other observing in a Z axis direction;

recording a first Y and Z axis coordinate position ($Y_1$, $Z_1$) when each of the indicators reads zero;

the steps (d), (e) and (f) further comprising the steps of:

vertically presenting the spindle alignment bar to the pair of dial indicators;

recording a second Y and Z axis coordinate position ($Y_2$, $Z_2$) when each of the indicators reads zero;

the method further comprising the steps of:

calculating a first trunnion distance observed error ($TDOE_1$) from a change in the Z axis coordinate positions according to the following equation:

$$TDOE_1 = Z_2 - Z_1 - TDP - ABL + \frac{ABD}{2};$$

calculating a second trunnion distance observed error ($TDOE_2$) from a change in the Y axis coordinate positions according to the following equation:

$$TDOE_2 = Y_2 - Y_1 - TDP - ABL + \frac{ABD}{2};$$

calculating a trunnion distance length error (TDLE) according to the following equation:

$$TDLE = \frac{TDOE_1 + TDOE_2}{2};$$

determining a normal direction length offset (NDLO) as the algebraic sum of TDLE and a tool length offset (TLO);

calculating a Crossover Error (COE) according to the following equation:

$$COE = \frac{TDOE_1 - TDOE_2}{2};$$

measuring any change ($\Delta X$) in position along the X axis of the machining center of a point at a selected distance (D) from an end of the spindle alignment bar as the bar is rotated about the trunnion axis between a horizontal position and a vertical position;

calculating a Slice Error (SE) for a tool having a predetermined tool length (TL); and compensating for the NDLO, COE and SE by adjusting the coordinate locations of a tool point in the computer numerical control of the machining center.

5. The method of claim 4, wherein each coordinate location of the tool point is adjusted by the computer numerical control according to the following equations:

Z axis compensation for the $NDLO = NDLO \cos \theta$

Y axis compensation for the $NDLO = NDLO \sin \theta$

Z axis compensation for the $COE = COE \cos \theta$

Y axis compensation for the $COE = COE \cos \theta$ $$\frac{TD + TL}{TD + ABL - D} (\Delta X) \sin\theta,$$

wherein $\theta$ is the angular position of the tool point about the trunnion axis and is monitored by the CNC of the machining center.

6. The method of claim 1, wherein the machining center has an orthogonal X, Y and Z coordinate system with the spindle trunnion axis being defined as parallel to the X axis and wherein the machining center has a planned trunnion distance length (TDP) and the spindle alignment bar has a predetermined length (ABL) and a predetermined diameter (ABD), the first coordinate location is $Y_1$, $Z_1$, and the second coordinate location is $Y_2$, $Z_2$; and step (g) further comprises the steps of:

calculating a first trunnion distance observed error ($TDOE_1$), from a change in Z axis coordinates according to the following equation:

$$TDOE_1 = Z_2 - Z_1 - TDP - ABL + \frac{ABD}{2};$$

calculating a second trunnion distance observed error ($TDOE_2$), from a change in Y axis coordinates according to the following equation:

$$TDOE_2 = Y_2 - Y_1 - TDP - ABL + \frac{ABD}{2};$$

calculating a trunnion distance length error (TDLE) according to the following equation:

$$TDLE = \frac{TDOE_1 + TDOE_2}{2}.$$

7. The method of claim 6, further comprising the steps of:
   determining a normal direction length offset (NDLO) as the algebraic sum of TDLE and a tool length offset (TLO); and
   compensating for the NDLO by adjusting each coordinate location of a tool point in the computer numerical control according to the following equations:

$Z$ axis compensation for the $NDLO = NDLO \cos \theta$ $Y$ axis compensation for the $NDLO = NDLO \sin \theta$.

8. The method of claim 1, wherein the machining center has an orthogonal X, Y and Z coordinate system with the spindle trunnion axis being defined as parallel to the X axis and wherein the machining center has a planned trunnion distance length (TDP) and the spindle alignment bar has a predetermined length (ABL) and a predetermined diameter (ABD), the first coordinate location is $Y_1$, $Z_1$, and the second coordinate location is $Y_2$, $Z_2$; and
   step (g) further comprises the steps of:
   calculating a first trunnion distance observed error ($TDOE_1$), from a change in Z axis coordinates according to the following equation:

$$TDOE_1 = Z_2 - Z_1 - TDP - ABL + \frac{ABD}{2};$$

calculating a second trunnion distance observed error ($TDOE_2$), from a change in Y axis coordinates according to the following equation:

$$TDOE_2 = Y_2 - Y_1 - TDP - ABL + \frac{ABD}{2}; \text{ and}$$

calculating a crossover error (COE) according to the following equation:

$$COE = \frac{TDOE_1 - TDOE_2}{2}.$$

9. The method of claim 8, further comprising the step of compensating for the COE by adjusting each coordinate location of a tool point in the computer numerical control according to the following equation:

$Z$ axis compensation for the $COE = COE \cos \theta$ $Y$ axis compensation for the $COE = COE \sin \theta$ wherein $\theta$ is the angular position of the tool point about the trunnion axis and is monitored by the CNC of the machining center.

10. The method of claim 1, wherein the machining center has an actual trunnion distance (TD), and further comprising the steps of:
    measuring any change ($\Delta X$) in position along the X axis of the machining center of a point a selected distance (D) from an end of the spindle alignment bar as the bar is rotated about the trunnion axis between a horizontal position and a vertical position;
    calculating a slice error (SE) for a tool having a predetermined tool length (TL) and attachable to the rotary spindle; and
    compensating for the SE according to the following equation:

$$X \text{ axis compensation for } SE = \frac{TD + TL}{TD + ABL - D} (\Delta X) \sin\theta,$$

wherein $\theta$ is the angular position of the tool point about the trunnion axis and is monitored by the CNC of the machining center.

11. An apparatus for compensating for tool point position offsets of a computer numerical controlled (CNC) machining center of the type having a rotary spindle, wherein the spindle includes a tool holder at one end and is pivotably mounted for rotation about a trunnion axis at an opposite end, said apparatus comprising:
    a spindle alignment bar mounted in the tool holder of the spindle;
    means for positioning the spindle alignment bar in contact with a reference point a first time and for rotating the spindle alignment bar 90° about the trunnion axis and for positioning the rotated alignment bar in contact with the same reference point a second time;
    computer means for recording a first coordinate location when the alignment bar contacts said reference point the first time and for recording a second coordinate location when the alignment bar contacts said reference point the second time;
    means for determining at least one rotary tool point offset related to at least one degree of freedom of motion of the machining center from the first and second coordinate locations; and
    means for compensating for said at least one rotary tool point offset by adjusting the coordinate locations of a tool point as the tool point moves to different locations during a machining operation.

12. The apparatus of claim 11, wherein said determining means comprises means for calculating a three dimensional rotary tool point offset from the first and second coordinate locations, the first and second coordinate locations being related to a degree of freedom of motion of the spindle, the degree of freedom of motion being measurable by at least one of the machining center and from a pair of dial indicators which define the reference point.

13. The apparatus of claim 11, wherein said at least one rotary tool point offset comprises a normal direction length offset (NDLO), a crossover error (COE) and a slice error (SE).

14. The apparatus of claim 11, wherein the machining center has an orthogonal X, Y and Z coordinate system with the spindle trunnion axis being defined as parallel to the X axis, and wherein the machining center has a planned trunnion distance (TDP), and the spindle alignment bar has a predetermined length (ABL) and a predetermined diameter (ABD) and said apparatus further comprises a pair of dial indicators mounted to a work table of the machining center to define the reference point, one indicator being positioned to observe in a Y axis direction and the other indicator being positioned to observe in a Z axis direction.

15. The apparatus of claim 14, wherein the first coordinate location is $Y_1$, $Z_1$ and the second coordinate location is $Y_2$, $Z_2$ and said determining means comprises means for calculating at least one of a normal direction length offset (NDLO), a crossover error (COE) and a slice error (SE).

16. The apparatus of claim 15, wherein the NDLO is the algebraic sum of a trunnion distance length error (TDLE) and a tool length offset (TLO), said TDLE being determined according to:

$$TDLE = \frac{TDOE_1 + TDOE_2}{2},$$

wherein $$TDOE_1 = Z_2 - Z_1 - TDP - ABL + \frac{ABD}{2}; \text{ and}$$

$$TDOE_2 = Y_2 - Y_1 - TDP - ABL + \frac{ABD}{2}.$$

17. The apparatus of claim 16, wherein the COE is determined:

$$COE = \frac{TDOE_1 - TDOE_2}{2}.$$

18. The apparatus of claim 17, wherein the machining center has an actual trunnion distance (TD) and further comprises:

means for measuring any change ($\Delta X$) in position along the X axis of the machining center of a point a selected distance (D) from an end of the spindle alignment bar as the bar is rotated about the trunnion axis between a horizontal position and a vertical position; and wherein said compensating means compensates for the slice error (SE) of a tool having a predetermined tool length (TL) and attachable to the rotary spindle according to:

$$X \text{ axis compensation for } SE = \frac{TD + TL}{TD + ABL - D} (\Delta X) \sin\theta,$$

wherein $\theta$ is the angular position of the tool point about the trunnion axis and is monitored by the CNC of the machining center.

19. The apparatus for claim 17, wherein said compensation means compensates for the NDLO and SE according to:

$Z$ axis compensation for the $NDLO = NDLO \cos\theta$ $Y$ axis compensation for the $NDLO = NDLO \sin\theta$ $Z$ axis compensation for the $COE = COE \cos\theta$ $Y$ axis compensation for the $COE = COE \sin\theta$, wherein $\theta$ is the angular position of the tool point about the trunnion axis and is monitored by the CNC of the machining center.

* * * * *